US005453821A

United States Patent [19]

Howes, Jr., et al.

[11] Patent Number: 5,453,821

[45] Date of Patent: Sep. 26, 1995

[54] APPARATUS FOR DRIVING AND CONTROLLING SOLENOID IMPACT IMPRINTER

[75] Inventors: Ronald B. Howes, Jr.; Thomas R. Emmons, both of Minneapolis; Dennis J. Warwick, Richfield, all of Minn.

[73] Assignee: DataCard Corporation, Minnetonka, Minn.

[21] Appl. No.: 988,855

[22] Filed: Dec. 10, 1992

Related U.S. Application Data

[62] Division of Ser. No. 749,625, Aug. 19, 1991, Pat. No.5,204, 802, which is a continuation of Ser. No. 276,235, Nov. 23, 1988, abandoned.

[51] Int. Cl.[6] ................................ H02F 7/08; H02F 7/16

[52] U.S. Cl. .......................... 335/263; 335/262; 335/281

[58] Field of Search .................................... 335/281, 255, 335/259, 261, 262, 263, 270, 274, 279; 310/12–24; 251/129.01–129.22

[56] References Cited

U.S. PATENT DOCUMENTS

| | | | |
|---|---|---|---|
| 3,577,107 | 5/1971 | Widl | 335/248 |
| 3,605,054 | 9/1971 | Conrath | 335/243 |
| 3,614,690 | 10/1971 | Jencks | 335/250 |
| 3,621,421 | 11/1971 | Conrath | 335/257 |
| 3,643,117 | 2/1972 | Alger et al. | 310/30 |
| 3,712,212 | 1/1973 | Beery . | |
| 3,737,692 | 6/1973 | Rahn | 310/15 |
| 3,789,272 | 1/1974 | Vollhardt . | |
| 3,820,455 | 6/1974 | Hencley et al. . | |
| 3,866,533 | 2/1975 | Gilbert et al. . | |
| 3,992,688 | 11/1976 | Keck | 335/272 |
| 4,027,761 | 6/1977 | Quaif . | |
| 4,042,895 | 8/1977 | Wafer et al. | 335/16 |
| 4,062,285 | 12/1977 | Deetz et al. . | |
| 4,077,026 | 2/1978 | Slade et al. | 335/195 |
| 4,083,299 | 4/1978 | Norton . | |
| 4,102,265 | 7/1978 | Deetz et al. . | |
| 4,103,617 | 8/1978 | O'Brien et al. . | |
| 4,131,865 | 12/1978 | Hart | 335/257 |
| 4,227,142 | 10/1980 | Jarret et al. | 322/3 |
| 4,262,592 | 4/1981 | Araki . | |
| 4,274,068 | 6/1981 | Thompson, Jr. | 335/20 |
| 4,280,404 | 7/1981 | Barrus et al. . | |
| 4,293,888 | 10/1981 | McCarty . | |
| 4,335,338 | 6/1982 | Sawyer | 318/135 |
| 4,345,564 | 8/1982 | Kawamura et al. . | |
| 4,347,786 | 9/1982 | Sweat, Jr. et al. . | |
| 4,353,656 | 10/1982 | Sohl et al. . | |

(List continued on next page.)

FOREIGN PATENT DOCUMENTS

WO87/03539 6/1987 WIPO .

OTHER PUBLICATIONS

Copy of the PCT International Search Report.
Copy of the Supplementary Partial European Search Report.

*Primary Examiner*—Leo P. Picard
*Assistant Examiner*—Raymond M. Barrera
*Attorney, Agent, or Firm*—Merchant, Gould, Smith, Edell, Welter & Schmidt

[57] ABSTRACT

A method and apparatus for a two-pulse solenoid embossing system implementing an amplitude feedback circuit, i.e., current monitor (48), to provide precise amplitude and timing control over two current pulses (4, 5), and thereby provide precision control over the position and velocity of the embossing system's print elements (**64*a*, 64*b*). To maintain the current amplitude during the second current pulse (5), the method and apparatus alternatively switches the power on and off to the solenoid coils (55) with a frequency such that a substantially constant current amplitude is maintained in the solenoid coils (55). The embossing system provides an improved solenoid body assembly (61) including a first stack of steel laminations (93), a center block (82) and a second stack of steel laminations (81). A plunger (62) is slidably connected to the solenoid body assembly (61) by shaft (63). Cavities (79) receive dowel pins (71) which are attached to plunger (62). The cavity and dowel pin arrangement (79, 71) prevents the plunger (62**) from rotating.

8 Claims, 8 Drawing Sheets

U.S. PATENT DOCUMENTS

| | | | |
|---|---|---|---|
| 4,360,855 | 11/1982 | Ohba . | |
| 4,366,524 | 12/1982 | Kuroiwa et al. . | |
| 4,370,613 | 1/1983 | Montagu | 324/154 R |
| 4,433,279 | 2/1984 | Bhate | 322/3 |
| 4,454,426 | 6/1984 | Benson | 290/1 R |
| 4,454,558 | 6/1984 | Huddart . | |
| 4,470,095 | 9/1984 | Doning . | |
| 4,500,938 | 2/1985 | Dulin . | |
| 4,512,339 | 4/1985 | McShirley | 128/41 |
| 4,533,890 | 8/1985 | Patel | 335/234 |
| 4,542,311 | 9/1985 | Newman et al. | 310/13 |
| 4,569,607 | 2/1986 | Takemoto . | |
| 4,577,174 | 3/1986 | Lemmer | 335/261 |
| 4,599,674 | 7/1986 | Ishikawa et al. . | |
| 4,600,965 | 7/1986 | Sato et al. . | |
| 4,607,197 | 8/1986 | Conrad | 318/115 |
| 4,631,627 | 12/1986 | Morgan . | |
| 4,653,945 | 3/1987 | Sato et al. . | |
| 4,667,117 | 5/1987 | Nebgen et al. . | |
| 4,674,897 | 6/1987 | West et al. . | |
| 4,729,056 | 3/1988 | Edwards et al. . | |
| 4,736,267 | 4/1988 | Karlmann et al. . | |
| 4,749,891 | 6/1988 | Sheng | 310/15 |
| 4,761,960 | 8/1988 | Higham et al. | 62/6 |
| 4,764,856 | 8/1988 | Rausch . | |
| 4,814,650 | 3/1989 | Curwen et al. | 310/22 |
| 4,848,943 | 7/1989 | Sutcliffe . | |
| 4,862,127 | 8/1989 | Lundstrom et al. | 335/257 |
| 4,924,675 | 5/1990 | Higham et al. | 62/6 |
| 4,947,283 | 8/1990 | Kono . | |
| 4,984,549 | 1/1991 | Mesenich | 123/472 |
| 5,013,223 | 5/1991 | Takahashi | 417/413 |

APPARATUS FOR DRIVING AND CONTROLLING SOLENOID IMPACT IMPRINTER

This is a division of application Ser. No. 07/749,625, filed Aug. 19, 1991, now U.S. Pat. No. 5,204,802, issued May 20, 1993 which is a continuation of application Ser. No. 07/276,235, filed Nov. 23, 1988, now abandoned.

BACKGROUND OF THE INVENTION

The present invention relates to a method and apparatus for driving and controlling an improved solenoid impact imprinter commonly used to emboss information onto a common credit card.

Automated embossing systems have found wide acceptance in the field. Two such systems are disclosed in (1) U.S. Pat. Nos. Re 27,809 to Drillick and 3,820,454 to Hencley et al. and (2) U.S. Pat. No. 3,820,455.

The present method, apparatus and improved solenoid structure builds on the invention disclosed in the application of Warwick et al., Ser. No. 204,499, hereby incorporated by reference. The Warwick application discloses a solenoid system in which the solenoid coil is energized in two stages, i.e., by a first and second current pulse. In the Warwick disclosure, as in the present invention, the first pulse is intended to bring the print elements into contact or close proximity with the material to be imprinted; the second pulse is intended to imprint the chosen material. Because the print elements are already in contact or in close proximity with the material to be imprinted when the embossing current pulse is applied, the loud impact noise of the printing elements striking the material is eliminated, thus providing an embossing operation with little noise. Using the two pulse method further reduces the velocity of the moving parts which also helps to reduce noise.

In addition to the noise problem, solenoid driven embossing systems generally encounter the problem of providing a solenoid body assembly (1) that limits heating of the solenoid structure due to eddy-current losses in the material used to construct the solenoid body assembly and (2) that enhances the durability and precision of the solenoid embossing structure. The prior art shows the use of magnetic materials such as steel for the solenoid body assembly.

In addition to other novel and patentable features, the present method, apparatus and improved solenoid structure improves on the two pulse method for energizing the solenoid coils. The present invention also provides an improved solenoid system to further enhance the durability and precision of the solenoid embossing system and to reduce eddy-current losses.

SUMMARY OF THE INVENTION

Accordingly, this invention provides an apparatus for controlling an impact imprinting system of a type including print elements used to imprint a chosen material. The apparatus includes solenoid structure for driving the print elements in response to a current pulse. Current pulse generator circuitry electrically interconnected to the solenoid structure generates and transmits first and second current pulses to the solenoid structure, the first current pulse having a contact duration and a contact amplitude sufficient to actuate the solenoid structure to cause the print elements to move to a position proximate the chosen material, the second current pulse having an imprint duration and an imprint pulse amplitude sufficient to actuate the solenoid structure to cause the print elements to imprint the chosen material to a desired character height. Current monitor circuitry electrically interconnected to the current pulse generator circuitry senses amplitude of the first and second current pulses and transmits first and second current amplitude sense signals representative of the amplitude of the first and second current pulses, respectively. Current pulse control circuitry electrically interconnected to the current pulse generator circuitry and the current monitor circuitry switches the current pulse generator circuitry between a pulse generating state and a nonpulse generating state. The current pulse control circuitry includes a first signal control which compares the first current amplitude sense signal received from the current monitor circuitry to a first predetermined amplitude value corresponding to the contact pulse amplitude and, upon detection of the first predetermined amplitude value, switches the current pulse generator circuitry to the nonpulse generating state after a first predetermined period of time, corresponding to the contact pulse duration. The current pulse control circuitry further includes a second signal control which compares the second current amplitude sense signal received from the current monitor circuitry to a second predetermined amplitude value corresponding to the imprint pulse amplitude and, upon detection of the second amplitude value, switches the current pulse generator to the nonpulse generating state after a second predetermined period of time, corresponding to the imprint pulse duration.

In another embodiment of this apparatus described above, the apparatus further includes a tri-state operation structure for selectively generating a first current signal which steeply increases in amplitude over time, a second current signal which gradually decreases in amplitude over time or a third current signal which steeply decreases in amplitude over time. The tri-state structure is used to generate a current signal which remains substantially constant over time, i.e., by alternating between generating the first current signal and the second current signal with a frequency such that the current signal remains substantially constant in amplitude over time.

In still another embodiment of the apparatus the control means includes a processing means for processing the first and second current amplitude sense signals to provide velocity and position information about the plunger, shaft, anvil and print elements.

This invention also provides a novel method of generating a current pulse through a solenoid coil of the type used in an impact imprinting system. Under this method a first current signal, which steeply increases in amplitude over time, is first applied. While applying the first current signal, current amplitude in the solenoid coil is sensed to obtain a sensed current amplitude signal. The sensed current amplitude signal is compared with a predetermined amplitude value to determine when the predetermined amplitude value is obtained. After the predetermined amplitude value is obtained, a second current signal, which gradually decreases over time, is applied for a predetermined duration. Finally, a third current signal, which steeply decreases over time, is applied until said current amplitude is substantially zero. Under the preferred embodiment, the method described is used to generate the first current pulse, which brings the print element to a position proximate the material to be imprinted.

However, the first current pulse may also be generated under another method which is used in the preferred embodiment to generate the second current pulse. Under this method a first current signal, which steeply increases in amplitude over time, is applied. While applying the first current signal, current amplitude in the solenoid coil is sensed to obtain a sensed current amplitude signal. The sensed current amplitude signal is compared with a predetermined amplitude value to determine when the predetermined amplitude value is obtained. After the predetermined amplitude value is obtained, said first current signal and a second current signal, which gradually decreases in amplitude over time, are alternatively applied with a frequency such that a substantially constant current amplitude, equal to said predetermined amplitude value, is maintained for a predetermined duration. Finally, a third current signal, which steeply decreases over time, is applied until current amplitude is substantially zero.

To reduce eddy-current losses and enhance the durability and the precision of the imprinting system, this invention further provides an improved solenoid apparatus. The apparatus includes a plunger, a housing, a solenoid coil, a shaft, and an anvil also referred to as a hammer, at the end of the shaft for engaging the print elements. The housing has an opening extending therethrough for slidably mounting the shaft. The housing also has a guiding structure for slidably aligning the plunger over the plunger opening of the housing. A solenoid coil is secured within the housing and is wrapped about a central portion of the solenoid body. The shaft is attached to the plunger and the shaft extends through the cavity of the solenoid coil. An anvil is attached to the shaft such that when a current is applied through the solenoid coil a resultant magnetic force is generated within the cavity such that the plunger, the shaft and the anvil are actuated in a direction along a center axis of the cavity.

The housing means includes a first stack of laminations where laminations within the first stack are secured to adjacent laminations. The housing further includes a second stack of laminations where laminations within said second stack are secured to adjacent laminations. A center block is secured between said first and second stacks.

This invention also provides a novel method for assembling solenoid housing. The method comprises stacking a first stack of laminations; securing the first stack so that laminations within the first stack are held in alignment; stacking a second stack of laminations; securing the second stack so that laminations within the second stack are held in alignment; and securing a center block between the first and second stacks.

An alternative method for assembling the solenoid housing may also be used. This alternative method includes stacking a first stack of laminations; stacking a second stack of laminations; stacking a center block between the first and second stacks; and simultaneously exposing the first stack, the second stack and the center block to an adhesive so as to maintain the first stack, the second stack and the center block in alignment.

These and various other advantages and features of novelty which characterize the invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described a preferred embodiment of the invention.

DETAILED DESCRIPTION OF PREFERRED EMBODIMENTS

A. Apparatus for Driving and Controlling Solenoid Impact Imprinter

Figure 1:
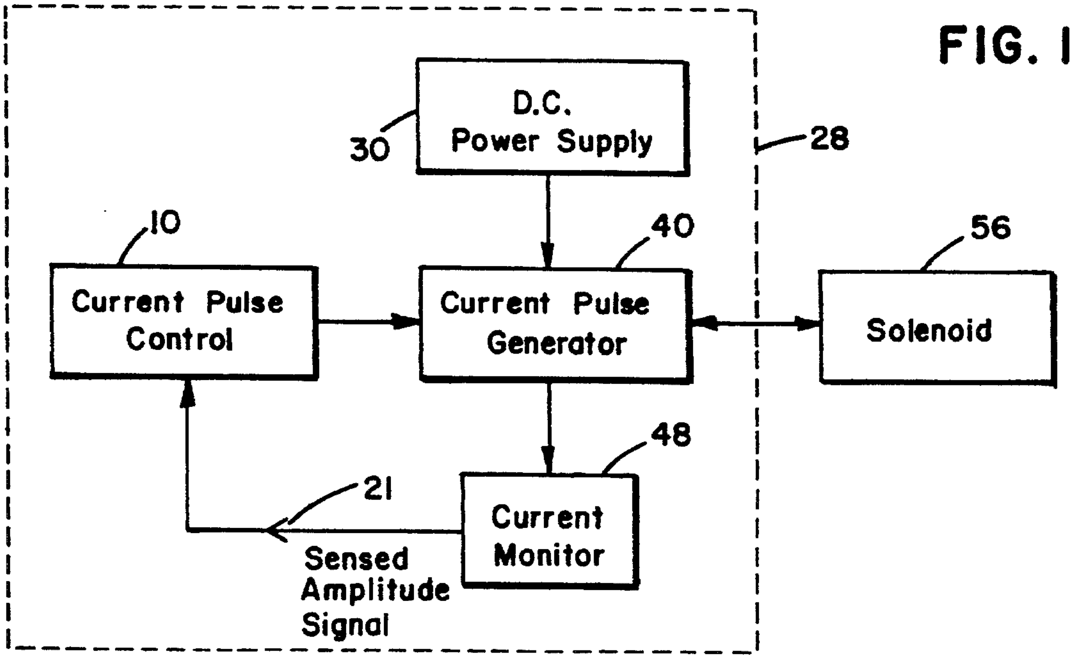
FIG. 1 is a block diagram representing the main elements of an embodiment of solenoid control circuitry used in accordance with the principles of the present invention to drive a solenoid used in an impact printer device.
Figure 2:
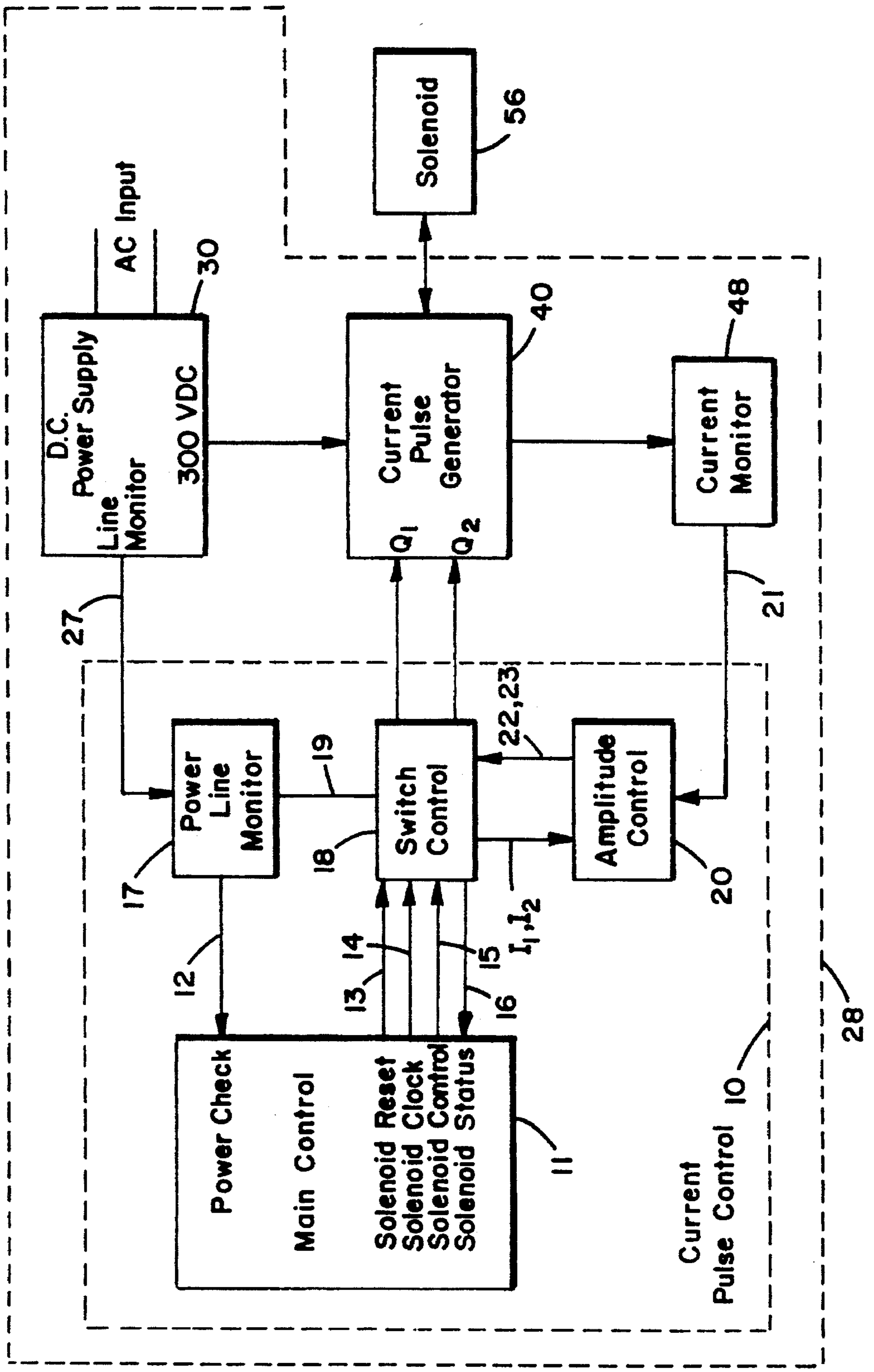
FIG. 2 is a more detailed block diagram representing the main elements of the solenoid control circuitry shown in FIG. 1 and further breaks down and shows the main elements of the current pulse control as shown in FIG. 1.
Figure 4:
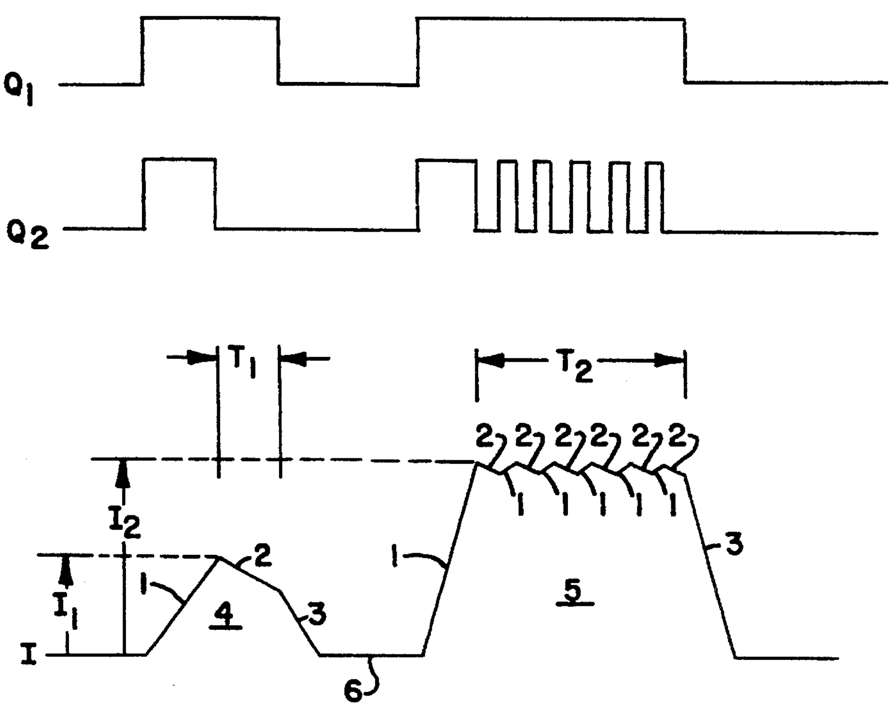
FIG. 4 is a timing diagram illustrating the operation of the solenoid control circuitry.
Figure 7:
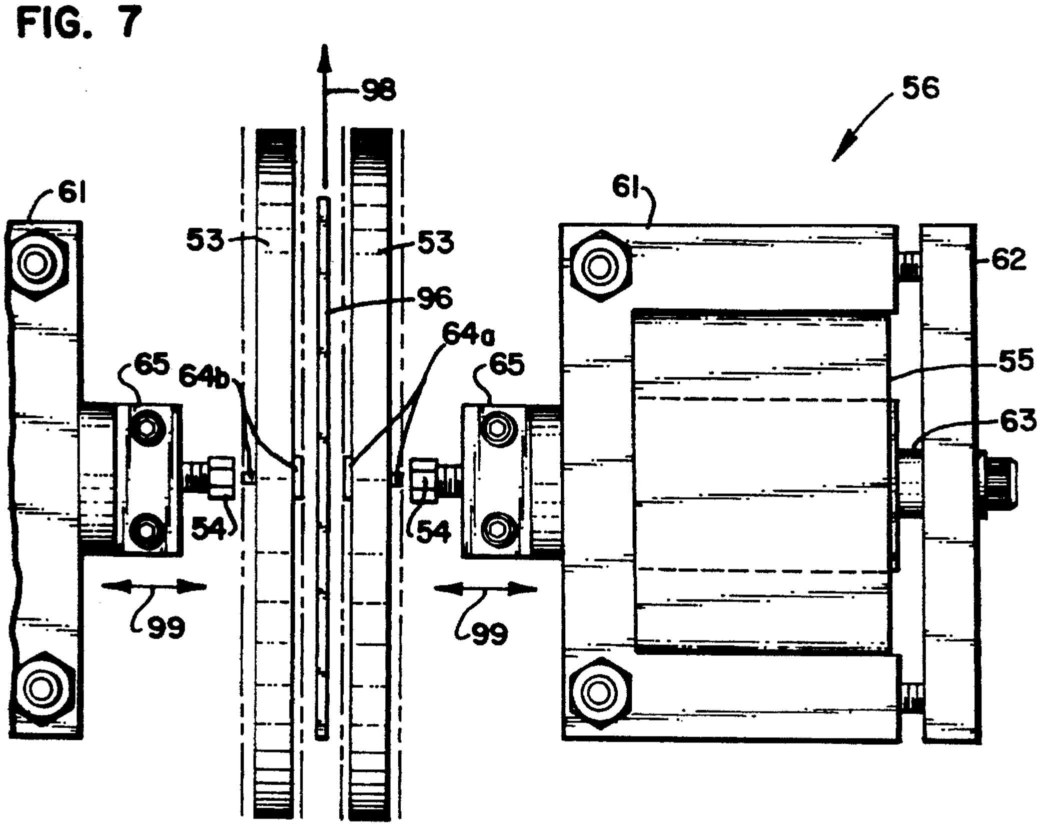
FIG. 7 is a top plan view showing the main elements of an embodiment of solenoid structure used to drive an impact imprinter.

The block diagrams of FIGS. 1 and 2 show the main elements of the solenoid control circuitry 28 that operates and empowers solenoid 56. The control circuitry 28 does this by controlling the current in the solenoid coil 55 per instructions from the current pulse control 10, and more specifically the main control 11. Under the present method, the current pulse control 10 transmits control signals Q1 and Q2 as shown in FIG. 4. In response to control signals Q1 and Q2, the current pulse generator 40 applies a current to the solenoid coil 55 in the form of first and second current pulses 4 and 5 as shown in FIG. 4. The first current pulse 4 is intended to bring the print element **64*a* (See FIG. 7, 64*a* is commonly known as the punch and 64*b* is commonly known as the die; in a two-solenoid impact imprinting printer, print element 64*b* would also be actuated in a similar fashion as 64*a*) into contact with the material to be imprinted. The second pulse 5 is intended to provide the embossing force to the solenoid coil 55. A 300-volt DC power supply 30 supplies the power to the current pulse generator 40. All the DC power is developed from an AC line power either directly or through a transformer, and then is rectified and stored in capacitors. The current monitor 48 senses the current amplitude in the solenoid coil 55 and transmits a sensed amplitude signal 21 to the current pulse control 10, and more specifically to the amplitude control 20. The current pulse control 10 uses the sensed amplitude signal 21 to control the amplitude and timing of the first and second current pulses 4, 5**.

FIG. 2 shows the current pulse control 10 in more detail. The main control 11 stores parameter information for the first and second current pulses 4, 5. This parameter includes amplitude information corresponding to contact and imprint amplitudes I1, I2, (see FIG. 4) and duration information corresponding to contact and imprint durations T1 and T2 (see FIG. 4). The main control 11 transmits solenoid reset 13, solenoid clock 14 and solenoid control 15 signals. The switch control 18 decodes these three signals and transmits the following outputs: (1) contact and imprint amplitude signals I1 and I2 to the amplitude control 20; and (2) control signals Q1 and Q2 as shown in FIG. 4 to the current pulse generator 40. The switch control 18 also transmits a solenoid status signal 16 to the main control 11, telling the main control 11 that the solenoid coil 55 is working electronically, and a timing control signal 19 to the power line monitor 17.

As part of generating the first current pulse 4, the amplitude control 20 receives input signal I1, determines the contact amplitude I1 and compares it to the sensed amplitude signal 21 from the current monitor 48. As part of generating the second current pulse 5, the amplitude control 20 receives input signal I2, determines the contact amplitude I2 and compares it to the sensed amplitude signal 21 from the current monitor 48. The amplitude control 20 transmits a current limit signal 23 to the switch control when I1 and I2 limits are achieved. The amplitude control section will also determine if the current pulse generator 40 outputs a current too high for normal operation. When the current output is too high, the amplitude control 20 transmits an over-current signal 22 to the switch control 18.

The switch control 18 decodes all the input signals from the main control 11 and provides proper control signals Q1 and Q2 in a proper time sequence (as shown in FIG. 4) to the current pulse generator 40. In response, the current pulse generator 40 generates the first and second current pulses 4, 5 as shown in FIG. 4. The switch control 18 also transmits a solenoid status signal 16 to the main control 11 telling the main control that the solenoids are operating properly.

The switch control 18 receives the solenoid reset 13, the solenoid clock 14 and the solenoid control 15 signals from the main control 11. The solenoid reset 13 signal starts the cycle (as shown in FIG. 4) and enables the switch control circuitry 18 as shown in FIG. 2. The solenoid clock 14 will count up to a proper level in a counter and also determine the first and second current pulses 4, 5 by its count. The I1 and I2 signals to the amplitude control 20 are direct outputs of this counter and will determine the levels to which the amplitude control 20 will decode. The count procedure is done before the first or second pulses 4, 5 are activated, i.e., for the second current pulse 5, the count procedure takes place during the quiet period 6.

The solenoid control 15 will start the solenoid cycle. In response to solenoid control signal 15, in either the first or second pulse 4, 5, the Q1 and Q2 control signals will go high—the full power current signal state 1 as shown in FIG. 4. As the current limits are reached, the switch control 18 receives the current limit signal 23 from the amplitude control 20. The solenoid status signal 16 will then go low, telling the main control 11 that the current limit was reached and, in response, control signal Q2 will go low—the slow decay current signal state 2.

In the case of the first pulse 4, the slow decay current state 2 will be held (Q1 on, Q2 off) for the contact duration T1. In the second pulse 5, the slow decay current state will be counted out in the counters for about one millisecond, after which, control signals Q1 and Q2 are set back to the full power current state (Q1 on, Q2 on) until the appropriate current limit is reached again. By alternating Q2 on and off, referred to as the chop mode or the alternating switch mode because it switches power on and off, a substantially constant current amplitude is maintained, equal to the imprint current amplitude I2. The current to the solenoid coil 55 is turned off the same way in the first or second pulse 4, 5 by the solenoid control signal 15; when the control signal 15 goes low, both Q1 and Q2 go low and the fast decay current state 3 starts.

The solenoid status signal 16 is deactivated differently from the first pulse 4 to the second pulse 5. The first pulse 4 will set the solenoid status signal high after receiving a reset signal 13 from the main control 11. The second pulse 5 will set the solenoid status signal high after receiving a solenoid clock signal 14 from the main control 11. If something went wrong during the cycle, the solenoid status signal 16 will not go high, but remain low. In the logic control, there are two circuits which will cause an immediate shut down and the solenoid status signal 16 will remain high which indicates a failure. In the counters there is an internal watchdog timer; if the solenoid stays on in the alternating switch mode for more than 100 milliseconds, then a failure will be signaled and all switches are turned off. Also, if the over-current signal from the amplitude control 20 goes low, the same failure mode will occur.

The power line monitor 17 is used to monitor the status of the DC power supply 30. Its purpose is to give as early as possible warning to the main control 11 that the power is not at a sufficient level or is being turned off. It is possible to accomplish this purpose by at least two methods: (1) by monitoring the DC power level; or (2) by monitoring the AC line as it crosses zero or as it is turned off and determining which has happened. When the power is insufficient or is turned off, the power line monitor signal 27 to the main control 11 goes high.

A detailed circuit diagram for the current pulse control 10 which transmits control signals Q1 and Q2 is not shown as such circuits are well know and within the skill of one of ordinary skill in the art. There are various ways to make this circuit, including discrete logic, microprocessors, etc.

Figure 3:
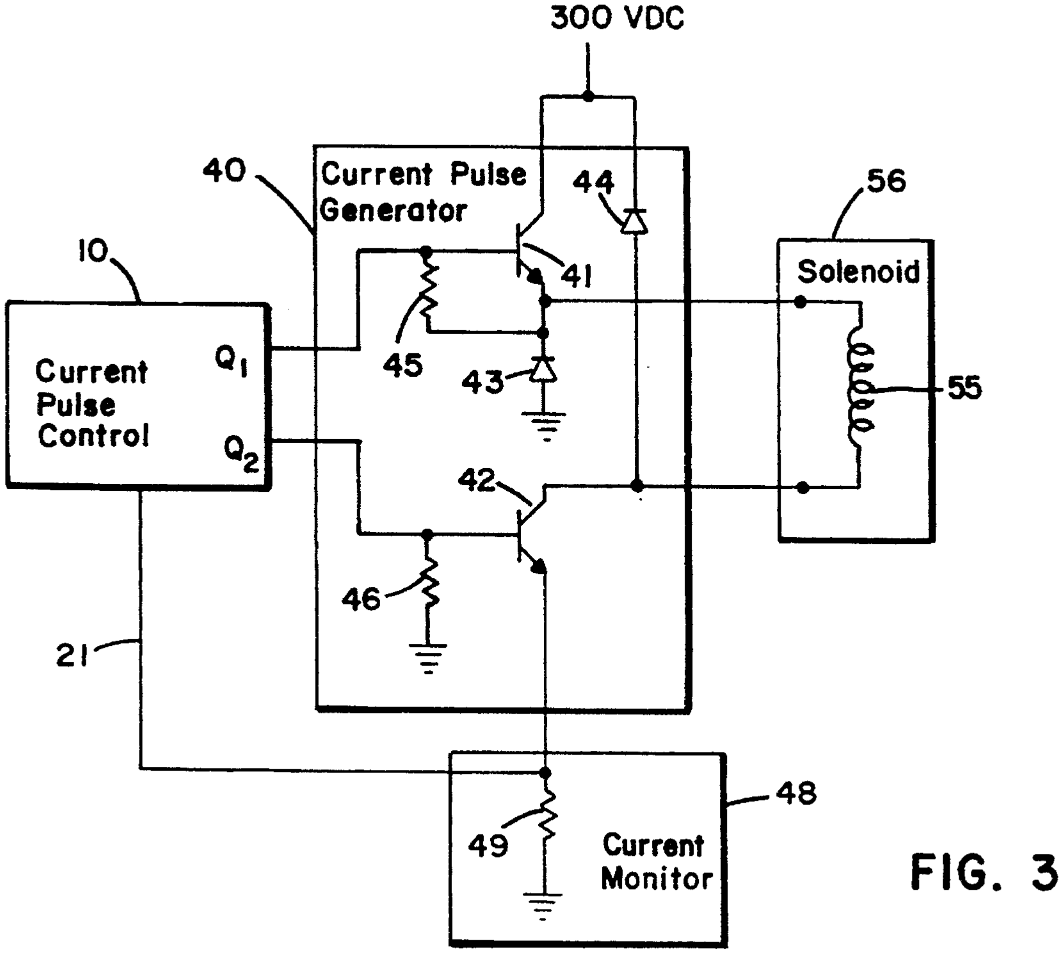
FIG. 3 a schematic electrical diagram representing the current pulse generator and the current monitor of FIG. 1 as interfaced with the current pulse control and the solenoid.

FIG. 3 shows a schematic electrical diagram for the current pulse generator 40 and the current monitor 48 as interfaced with the current pulse control 10 and solenoid coil 55. The current pulse generator in the preferred embodiment includes an upper transistor 41, a lower transistor 42, a first diode 43, and a second diode 44. The current monitor 48 in the preferred embodiment includes a sense resistor 49 electrically connected to the emitter of lower transistor 42. A 300 volt DC power supply supplies the power to the current pulse generator 40. While the upper and lower transistors 41,42 shown are presently bipolar technology using transistors that have collector, base, and emitter connections; these may be substituted with field effect power transistors (FETs) which consist of respectively drain, gate and source connections.

The current pulse generator 40 receives control signals Q1 and Q2 from the current pulse control 10. FIG. 4 shows the sequence of the control signals Q1 and Q2 and the resulting behavior of the coil current as monitored by the current monitor 48. At the start of the sequence, both upper and lower transistors 41 and 42 are turned off, and no current flows through the solenoid coil 55. To start the first pulse 4, both upper and lower transistors 41 and 42 are turned on, thus generating a full power current signal 1 which steeply increases in amplitude over a period of time as shown in FIG. 4. During the full power current state, the current flows from the DC power supply 30, through upper transistor 41, solenoid coil 55, lower transistor 42 and finally through the sense resistor 49 of the current monitor 48.

The current monitor 48 transmits a sensed amplitude signal 21 to the current pulse control 10, and more specifically to the amplitude control 20. When the sensed amplitude signal equals either the contact amplitude I1 or imprint amplitude I2, the amplitude control transmits a current limit signal 22 to the switch control 18 which in turn will turn off lower transistor 42. The current pulse generator 40 is in the slow decay current state 2 as shown in FIG. 4 (upper transistor 41 on, lower transistor 42 off). At this point the solenoid coil current will begin to flow through the second diode 44, the DC power supply 30, the upper transistor 41 and the solenoid coil 55. This current flow produces a small negative voltage across the solenoid coil 55, thus causing the current to slowly decay during the contact duration T1. During the slow current decay state 2, the solenoid coil current is maintained substantially constant during the contact duration T1. Note that the current pulse control could be programmed so that the alternating switch mode is also used during the first current pulse 4 to maintain the current amplitude substantially constant, equal to the contact current amplitude I1.

At the end of the contact duration T1, the upper transistor 41 is turned off, placing the current pulse generator in the fast decay current state 3. During the fast decay current state, the solenoid coil current flows through the first diode 43, and solenoid coil 55, the second diode 44, and the power supply 30.

Following the first current pulse 4, the upper and lower transistors 41 and 42 remain off for a predetermined quiet period 6. At the end of the quiet period 6, both upper and lower transistors 41 and 42 are turned on, thus starting the second current pulse 5. The current amplitude is again controlled by the current monitor 48 and the amplitude control 20. When the sensed amplitude 21 equals the imprint amplitude I2, the amplitude control 20 sends a current limit signal 23 to the switch control 18 which in turns sends a control signal to the current pulse generator 40 causing lower transistor 42 to be turned off. For the imprint duration T2, the current pulse generator 40 goes into the alternating switch mode as shown in FIG. 4. During the alternating switch mode the lower transistor 42 is turned off and on with a frequency such that a substantially constant current amplitude, equal to the imprint current amplitude I2, is maintained for the imprint duration T2. To complete the second current pulse 5, upper transistor 41 is turned off to allow fast decay of the current through the solenoid coil 55.

The combination of the first pulse 4 and the amplitude controlled second pulse 5 allows operation of the solenoid 56 in two motions, a first control motion to bring the print element 64*a* (see FIG. 7) into contact with the material with a low force, and a second high force motion to provide the required embossing force. This circuit achieves high efficiency by using the alternating switch mode to control the level of current in the solenoid coil 55, rather than a means such as current limiting resistors which dissipate power.

B. Method for Driving and Controlling Solenoid Impact Imprinter.

Figure 5:
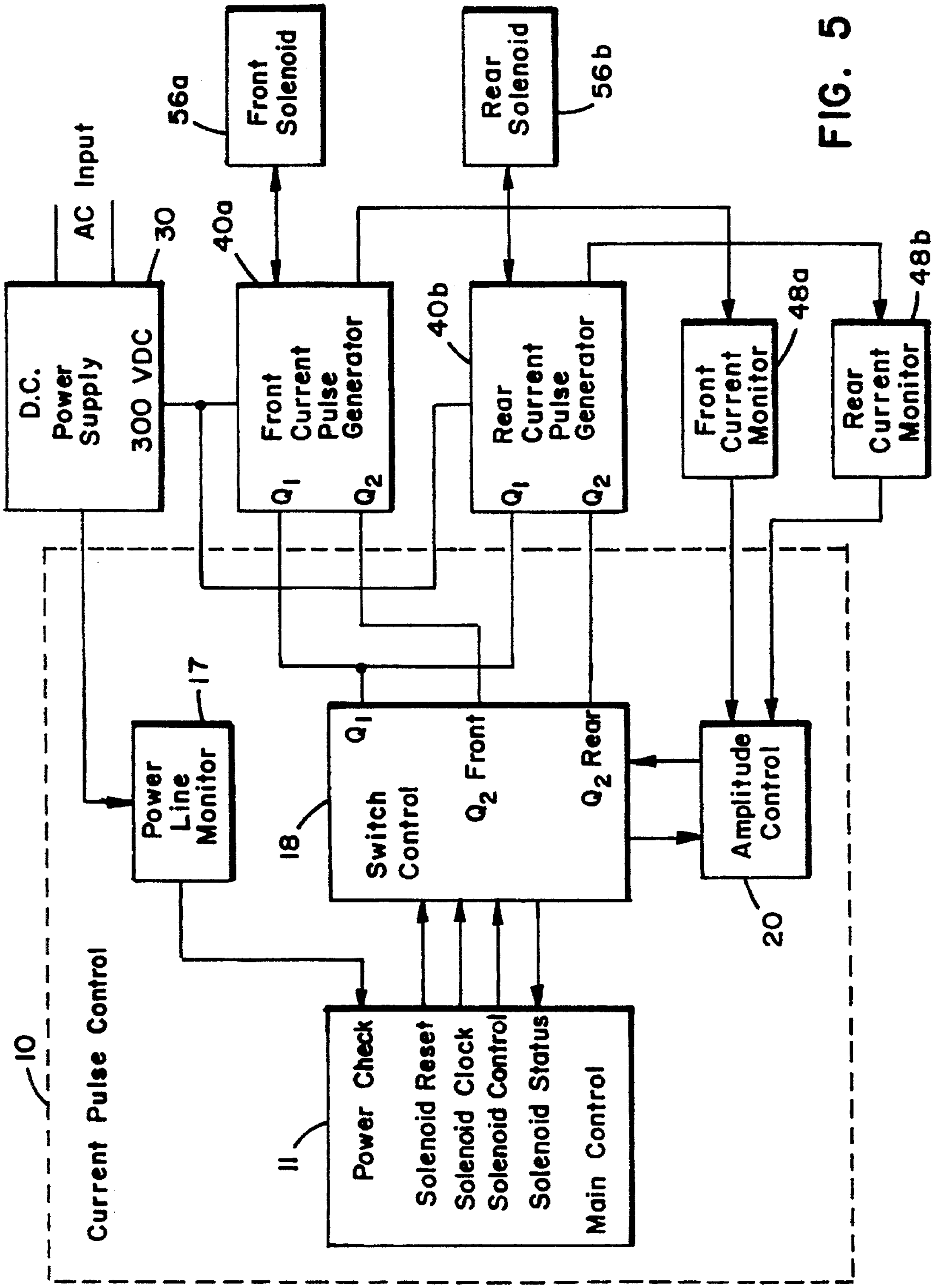
FIG. 5 a block diagram representing an embodiment of solenoid control circuitry used to drive a two-solenoid impact imprinting printer.
Figure 6:
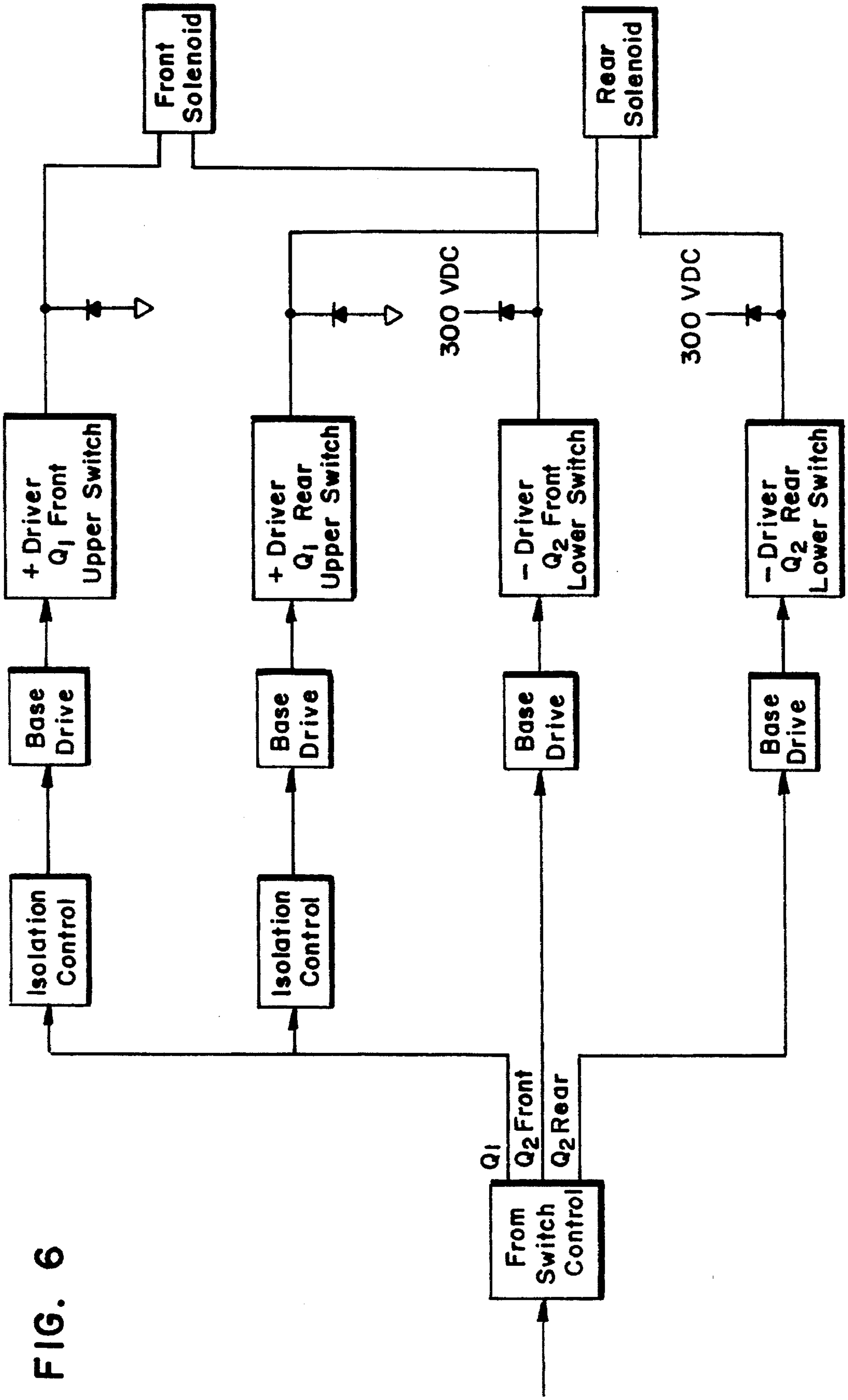
FIG. 6 is a block diagram representing the current pulse generators of the solenoid control circuitry shown in FIG. 5.

This invention in part relates to a method for driving and controlling a solenoid embossing system used for imprinting or embossing sheet material such as a common credit card. This method can be used to drive and control a one or two-solenoid embossing system. FIGS. 5 and 6, for example, are block diagrams representing the main elements of the control circuitry 28 which is used to drive a two-solenoid impact imprinter. For an understanding of this invention, however, describing the method and apparatus as used to control a one-solenoid embossing system is sufficient.

Figure 8:
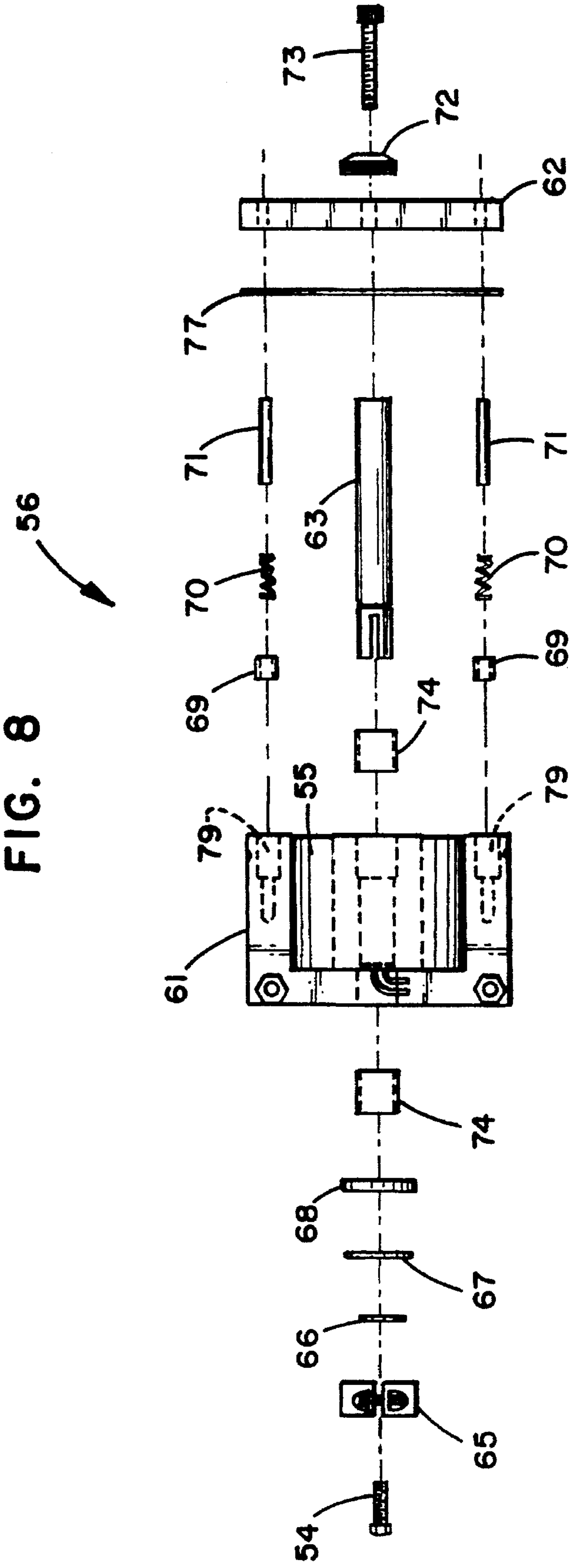
FIG. 8 is an exploded assembly of the solenoid structure shown in FIG. 7.
Figure 9:
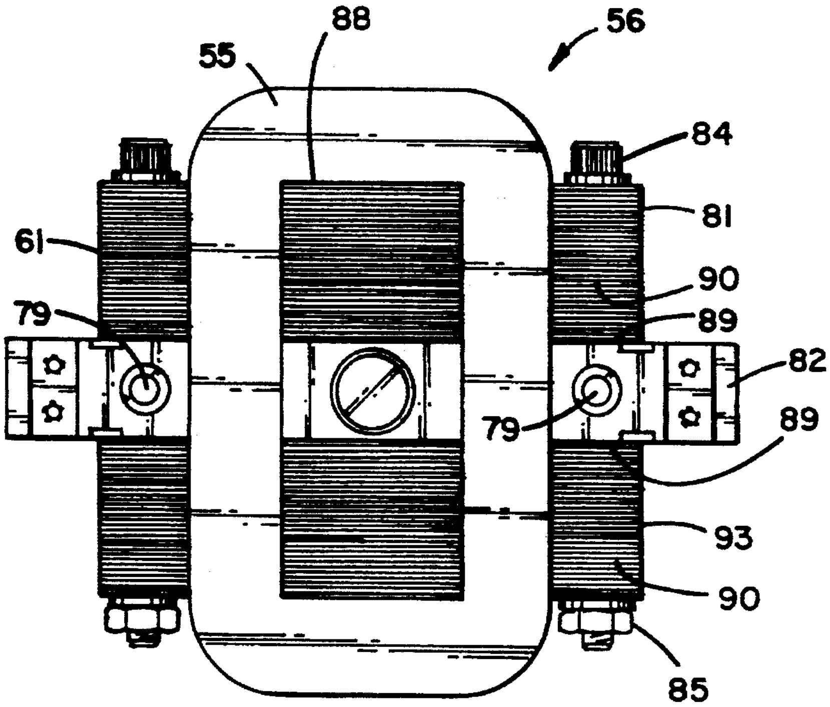
FIG. 9 is a front plan view showing the main nonmoving elements of an embodiment of the solenoid structure shown in FIG. 7.

FIGS. 7, 8 and 9 show a solenoid system that may be used as part of an impact imprinter. The solenoid system includes a solenoid coil 55, print elements 64*a* and 64*b*, a shaft 63 attached to an anvil 54 and suspended within the solenoid coil 55, and a plunger 62 slidably connected to the solenoid body assembly 61 through dowel pins 71 and cavities 79 for receiving the dowel pins 71.

Generally, when current is passed through the solenoid coil 55, a net magnetic field results along the axis of the shaft 63. The magnetic field, in turn, attracts the plunger 62, thereby moving the shaft 63 causing the print element 64*a* to imprint the chosen material. Thus, by controlling the current in the solenoid coil 55, the print elements 64 can be controlled. The method and apparatus in this invention is designed to control current flow in the solenoid coil 55, and thereby control the movement of print element 64*a*, in such a way as to provide minimum noise and power dissipation in the drive electronics while maintaining precise control over the timing and movement of the print element 64*a*.

The current sense curve I of FIG. 4 illustrates the method for applying current to the solenoid coil 55. The method applies the current to the solenoid coil 55 in the form of first current pulse 4 and a second current pulse 5. The current monitor 48 in combination with the current pulse control 10, as shown in FIGS. 1, 2 and 3, controls the timing and amplitude of the first and second pulses 4, 5. The current monitor 48 senses the current amplitude and transmits a sensed amplitude signal 21 to the current pulse control 10. The current pulse control 10 compares the sensed amplitude signal 21 with stored amplitude information to determine when the desired current amplitude in the solenoid coil 55 is obtained. The current pulse control 10 also processes the sensed amplitude signal 21 to obtain velocity and position information about the print element 64*a*.

Turning now to the more specific steps of the present inventive method for controlling a solenoid impact imprinter, initially, no current is applied to the solenoid coil. 55. The current pulse generator 40, which could be any current pulse generator designed to provide pulses in the fashion described here, then transmits a first current pulse through solenoid coil 55. The first current pulse 4 is intended to bring the print element 64*a* into contact with the material to be imprinted. Thus, the first current pulse 4 has a contact duration T1 and a contact amplitude I1 sufficient to actuate the solenoid coil 55 to cause the print element 64*a* to move to a position substantially in contact with the material to be imprinted.

The current pulse generator 40 then transmits a second current pulse 5 through the solenoid coil 55. The second current pulse 5 is intended to imprint the chosen material. Thus, the second current pulse 5 has an imprint pulse duration T2 and an imprint pulse amplitude I2 sufficient to actuate the solenoid coil 55 to cause the print element 64*a* to imprint the chosen material to a desired character height.

While the current pulse generator 40 transmits the first and second current pulses 4, 5, a current monitor 48 senses the current amplitude in the solenoid coil 55 to obtain a sensed amplitude signal 21. Under the present method, this sensed amplitude signal 21 is processed to provide velocity and position information about the print element 64*a*. The velocity and position information is used to control the timing of the first and second current pulses 4, 5. The sensed amplitude signal 21 is further processed to provide amplitude control over the first and second current pulses 4, 5, such that a contact amplitude I1 is obtained during the first current pulse 4 and an imprint pulse amplitude I2 is obtained during the second current pulse 5.

Velocity and position information corresponding to the print element 64*a* movement can be derived from sensing a signal proportional to the current, and thus also to the force, in the solenoid coil 55. Current and force, in turn, are proportional to the acceleration of the print element 64*a*. Integrating the sensed signal proportional to acceleration results in a signal proportional to the velocity of the print element 64*a*. Integrating this velocity signal, in turn, results in a signal proportional to the position of the print element 64*a*.

Under the present apparatus as disclosed in FIG. 3, the sensed amplitude signal 21 is the voltage drop across sense resistor 49 which is electrically connected in series with the solenoid coil 55. Because the sense resistor 49 is connected in series with the solenoid coil 55, the voltage drop across sense resistor 49 is proportional to the current flow through solenoid coil 55 which, in turn, is proportional to the force exerted on and acceleration of the print element 64*a*. Thus, the velocity of the print element 64*a* is proportional to the integrated voltage drop across sense resistor 49, and the position of the print elements is proportional to the double integral of the voltage drop across sense resistor 49.

The method further includes steps for generating the first and second current pulses 4, 5, such that the noise and power dissipation is held to a minimum. To generate the first and second current pulses 4, 5, this method requires a current pulse generator means capable of selectively generating one of three current signals (tri-state current signal operation) as shown in FIG. 4 including a full power current signal 1, a slow decay current signal 2, and a fast decay current signal 3. The full power current signal 1 corresponds to the current signal which steeply increases in amplitude over time. The slow decay current signal 2 corresponds to the current signal which gradually decreases in amplitude over time such that the current amplitude is maintained substantially constant. The fast decay current signal 3 corresponds to the current signal which steeply decreases in amplitude over time.

The first current pulse 4 begins with a full power current signal 1 causing the current in the solenoid coil 55 to steeply increase in amplitude over time. While the current amplitude in the solenoid coil 55 rises, the current monitor 48 senses the current amplitude and compares the sensed amplitude signal 21 with the desired contact amplitude I1. After the contact amplitude I1 is obtained, the current pulse generator 40 applies a slow decay current signal 2 to the solenoid coil 55 causing the current in the solenoid coil 55 to gradually decrease over time for the contact duration T1. Finally, after the contact duration T1 has passed, the current pulse generator 40 applies the fast decay current signal which causes the current amplitude in the solenoid coil 55 to steeply decrease over time until the current amplitude is substantially zero.

The second current pulse 5 also begins with a full power current signal 1 causing the current amplitude in the solenoid coil 55 to steeply increase over time. Again, while the amplitude in the solenoid coil 55 increases, the current monitor 48 senses the current amplitude in the solenoid coil 55 and compares the sensed amplitude signal 21 with the imprint amplitude I2 to determine when the imprint amplitude I2 is obtained. After the imprint amplitude I2 is obtained, the current pulse generator 40 then alternates between a slow decay current signal 2 and a full power current signal 1 with a frequency such that a substantially constant current amplitude, equal to the imprint amplitude I2, is maintained for the imprint duration T2 as shown in FIG. 4. Finally, a fast decay current signal 3 is applied to the solenoid coil 55 causing the current in the solenoid coil 55 to steeply decrease over time until the current amplitude is substantially zero.

C. The Solenoid Structure.

FIG. 7 shows the solenoid structure 56 as positioned with respect to the material 96 to be embossed, i.e., a credit card 96, and the card path 98. Although not shown, a second solenoid structure could be used to drive print element 64*b* in the same manner as print element 64*a* is driven. As a current pulse is applied through the solenoid coil 55, the shaft/plunger/anvil arrangement 63,62,54 are actuated in the direction shown by arrows 99. The anvil 54 engages print element 64*a*, which is held within a retaining band 53, and the print element engages and embosses the credit card 96 in response to the first and second current pulses 4, 5. In a two-solenoid impact imprinting system, print element 64*b* is also actuated by the two pulse method described in sections A and B above. In a single solenoid system, print element 64*b* is in a stationary position adjacent the material to be imprinted.

As shown in FIG. 8, the cavity and dowel pin arrangement 79, 71 prevents the plunger 62 from rotating while the brushings 74 slidably align the shaft 63 within the solenoid body 61. Dowel pins 71 are attached to the plunger 62 and are slidably received in bearings 69 located in cavities 79. Return springs 70 are coaxially disposed about the dowel pins 71 and received in the cavities 79 for returning the plunger 62 to and holding the plunger 62 in the at rest position. Bearings 69 permit the dowel pins 71 to easily move with respect to the solenoid body assembly 61. The socket screw 73 and washers 72 attach the plunger 62 to the shaft 63. The anvil 54 is threadably attached to the shaft 63 and secured by a collar member 65. A damping washer 68, a thrust washer 67, and a retaining ring 66 cooperate to provide an at rest stop function for the shaft/plunger/anvil arrangement 63,62,54. Shim 77 is attached to the plunger 62 to provide a nonmagnetic gap so as to prevent the plunger 62 from sticking to the solenoid body assembly 61 when there is no current flowing in the coil 55.

Figure 10:
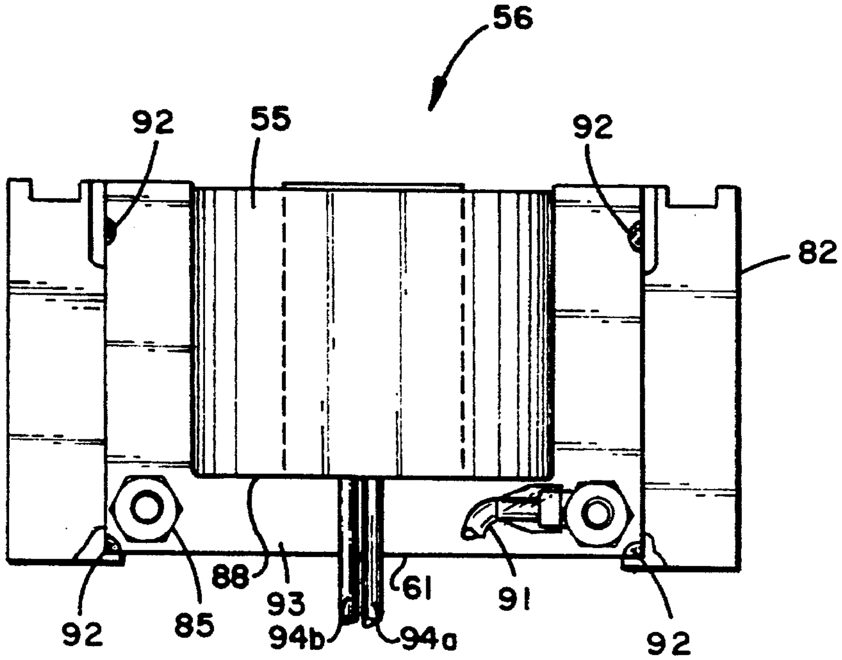
FIG. 10 is a bottom plan view of the solenoid structure shown in FIG. 9.

FIGS. 9 and 10 best show the solenoid body assembly 61. Structurally, the solenoid body assembly 61 includes the following parts: a first stack 93 of steel laminations; a center block 82, a second stack 81 of steel laminations, a cap screw and nut assembly 84, 85, a first adhesive 88, a second adhesive 90 and a third adhesive 89. The solenoid body assembly 61 is attached to the solenoid coil 55 using the first adhesive 88. In the preferred embodiment, the first adhesive 88 is epoxy but may also be RTV silicone. Note that the laminations are preferably steel but may also be made of a suitable magnetic material having a large electrical resistance such as a sintered material which minimizes eddy-currents and power loss caused by eddy-currents. In the preferred embodiment, the center block 82 is made of aluminum or some other nonmagnetic material. In alternative embodiments, the center block 82 might be made of magnetic materials such as steel. In yet other embodiments, the center block 82 might not be present. Rather, the solenoid body 61 could include a single stack of laminations machined to receive the shaft plunger/anvil/arrangement 63,62,54.

To form the first and second stacks 93, 81, a second adhesive 90 is applied over the entire surface of each lamination to hold the laminations together. In the preferred embodiment, the laminations are bonded together with epoxy; for example, by vacuum impregnating with epoxy. One specific example is #8821 with C321 reactor sold by Epoxylite of California. Another adhesive product which might be used in alternative embodiments of the invention is a cyanoacrylate such as Superbonder #420 made by Loctite of Connecticut. Before assembling the first stack 93, the center block 82 and the second stack 81, the laminations within each stack may be welded together in at least one place (FIG. 10 illustrates four weld spots 92.) The weld spots 92 facilitate alignment and provide for electrical continuity between all laminations. The center block 82 is then attached to the first stack 93 and the second stack 81 using a third adhesive 89 over the entire contact surface between the center block 82 and laminations. In the preferred embodiment the adhesive 89 is epoxy. In an alternative embodiment, the third adhesive 89 is an anaerobic adhesive such as Speedbonder #324 made by Loctite of Connecticut. Finally, to further secure the center block 82 between the first and second stacks 93, 81, a cap screw 84 and nut 85 assembly is used as shown in FIG. 9.

An alternative method of assembly includes assembling the first stack 93, the center block 82 and the second stack 81 and then simultaneously bonding the assembly, i.e., by exposing the entire assembly to epoxy. In many situations, a preferred method of assembly is to assemble all of the components shown in FIGS. 9 and 10 and then simultaneously bonding the total assembly by exposing the entire assembly to epoxy.

Also shown in FIG. 10, is an electrical ground wire 91 for grounding the solenoid body 61 and coil terminal wires *94a*,*94b*.

Figure 11:
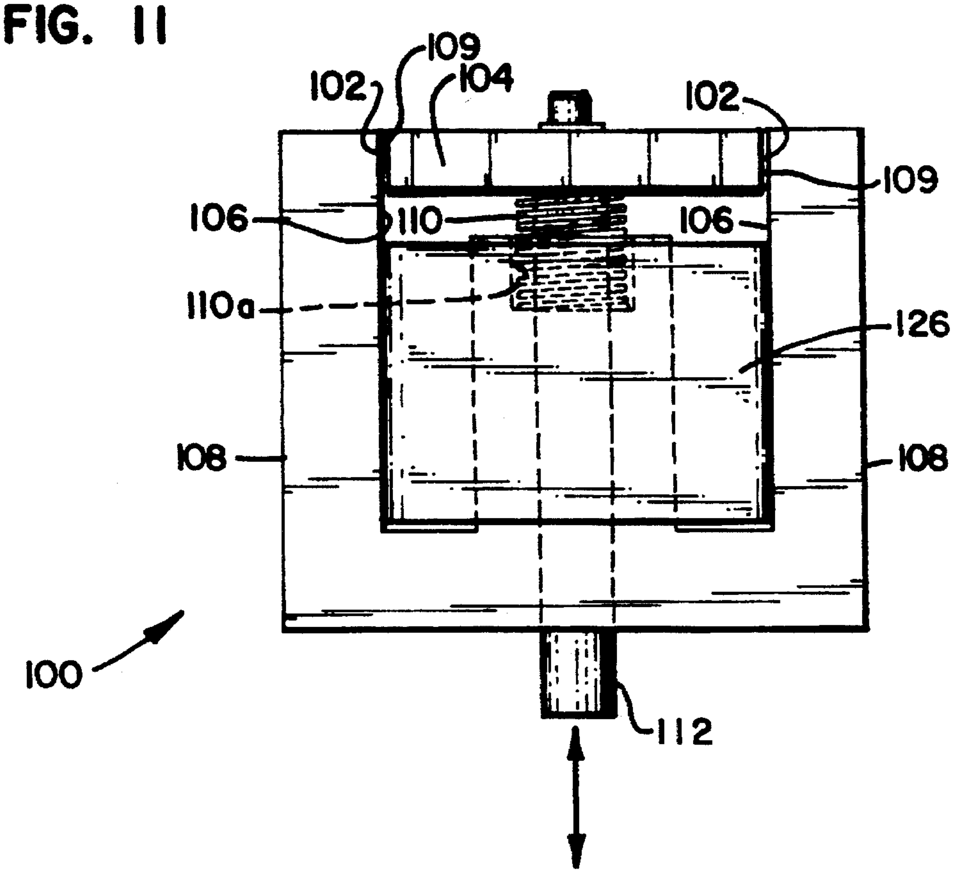
FIG. 11 is a top plan diagrammatic view of an alternate embodiment of a solenoid structure.

Illustrated in FIG. 11 is an alternative embodiment of a solenoid structure 100. In this embodiment, an antirotation function is provided by edges 102 of a plunger 104 riding in between edges 106 of a laminated stack 108. A suitable bearing material 109 might be present on either the plunger 104 or the laminated stack 108 to prevent the plunger 104 from rubbing against the laminated stack 108. A single return spring 110 is coaxially mounted about a shaft 112 intermediate of the solenoid laminated stack 108 and the plunger 104. A spring receiving recess *110a* is provided in the solenoid body 108 so as to allow the plunger 104 to abut against the solenoid body 108. The use of a single spring facilitates a balanced load. This alternative embodiment provides for further precision in control as well as a longer stroke if required. This embodiment facilitates the use of a plunger having a lower mass which results in better control due to the reduction in stored energy. The force versus stroke performance will be more linear adding even more precision to the control.

Figure 12:
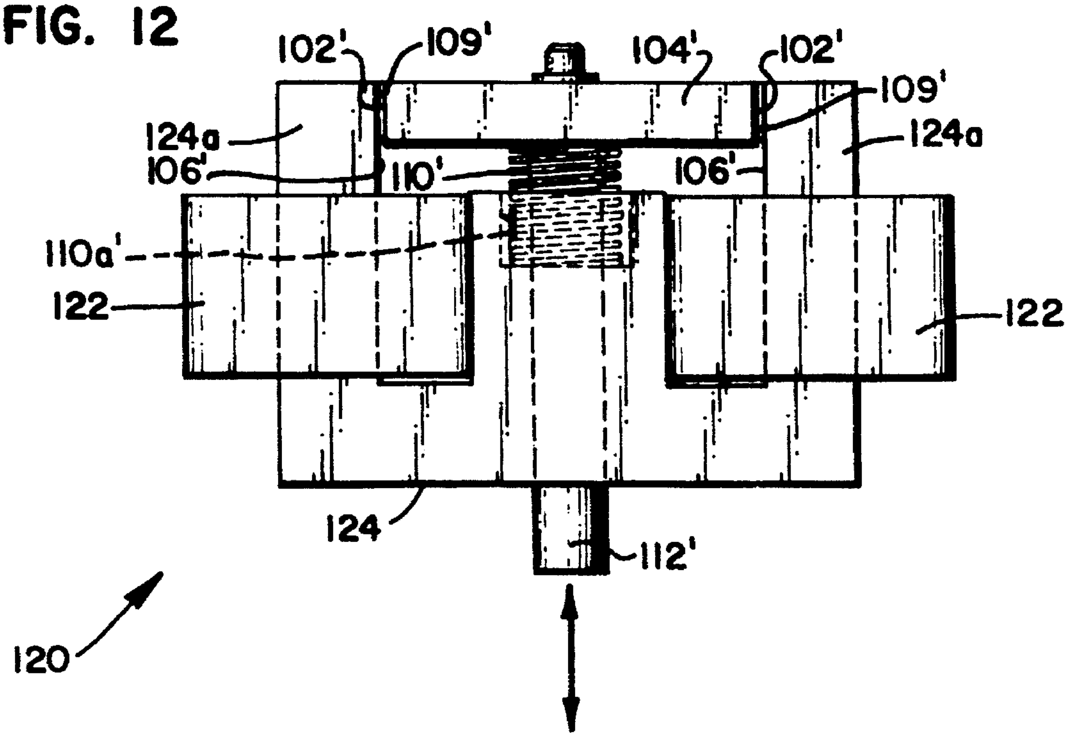
FIG. 12 is a top plan diagrammatic view of yet another alternative embodiment of a solenoid structure.

Even further efficiencies can be obtained by making the magnetic path shorter as is the case with the alternative embodiment 120 illustrated in FIG. 12. In FIG. 12, coils 122 are wrapped around leg portions *124a* of the solenoid stack 124. By wrapping the coils 122 around the leg portions *124a*, the coils can be made shorter than a single coil as shown in FIG. 11 and as represented by reference numeral 126. A lamination stack 124 can also be made shorter, thus reducing the magnetic path lengths which will increase efficiency. In the embodiment shown, there are two physically separate coils, although they might be electrically interconnected. It will be appreciated that the coil arrangement shown in FIG. 12 might be applied to the embodiment shown in FIGS. 9 and 10.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A solenoid apparatus, comprising:

(a) a housing having a bore extending therethrough;

(b) a shaft slidably disposed in the bore of the housing;

(c) a solenoid coil secured within said housing;

(d) a plunger attached to a first end of the shaft;

(e) a dowel attached to the plunger; and (f) the housing including;

(i) a first and second stack of laminations wherein laminations within said first and second stack are secured to adjacent laminations;

(ii) alignment means for holding said first and second stack in alignment; and (iii) a center block having an alignment cavity, the center block disposed between the first and second stack of laminations;

(iv) wherein all the laminations in the solenoid apparatus are immobile in said housing, and wherein the dowel is slidably disposed within the alignment cavity.

2. The solenoid apparatus of claim 1 wherein said laminations of said first and second stack are made of steel.

3. The solenoid apparatus of claim 1 wherein said laminations of said first and second stack are made of sintered material.

4. The solenoid apparatus of claim 1 wherein said laminations of said first and second stack are welded to said adjacent laminations in at least one spot between each lamination.

5. The solenoid apparatus of claim 1 wherein said alignment means is an adhesive used between said first stack, said center block and said second stack.

6. The solenoid apparatus of claim 1 wherein said alignment means is a nut and bolt assembly.

7. The solenoid apparatus of claim 1 further comprising return spring that fits slidably around said dowel between said housing and said plunger such that when said resultant magnetic force is applied, said return spring is compressed, and when said resultant magnetic force is released, said return spring returns said plunger back to a rest position.

8. A solenoid apparatus, comprising:

(a) a housing having a bore extending therethrough;

(b) a shaft slidably disposed in the bore of the housing;

(c) a solenoid coil secured within said housing;

(d) a plunger attached to a first end of the shaft;

(e) a dowel attached to the plunger; and (f) the housing including;

(i) a first and second stack of laminations wherein laminations within said first and second stack are secured to adjacent laminations;

(ii) alignment means for holding said first and second stack in alignment; and (iii) a center block having a shaft cavity and an alignment cavity, the center block disposed between the first and second stack of laminations;

(iv) wherein the shaft is slidably disposed within the shaft cavity and wherein the dowel is slidably disposed within the alignment cavity.

* * * * *